Patented July 11, 1950

2,515,119

UNITED STATES PATENT OFFICE

2,515,119

VULCANIZATION OF RUBBER

Albert F. Hardman, Akron, Ohio, assignor to Wingfoot Corporation, Akron, Ohio, a corporation of Delaware No Drawing. Continuation of application Serial No. 508,405, October 30, 1943. This application September 17, 1945, Serial No. 616,967

2 Claims. (Cl. 260—785)

This invention relates to the vulcanization of rubber with amino esters of dithiocarboxylic acids. These new compounds and methods of preparing them are claimed in my copending application Serial No. 508,403, filed October 30, 1943, now abandoned.

The new compounds are prepared by reacting ammonia or an amine with formaldehyde and a dithiocarboxylic acid. The amine may contain one or more nitrogen groups, and the nitrogen groups may be separated by an aliphatic or aromatic radical, such as ethylene, propylene, phenylene, naphthylene, diphenyl, etc.

The dithiocarboxylic acids useful in the invention are those acids in which the dithio acid group is directly connected to a carbon of the acid residue as, for example, dithiofuroic acid; the dithionaphthoic acids, including the hydroxy-substituted compounds, such as 2-hydroxy-1-dithionaphthoic acid and 1-hydroxy-2-dithionaphthoic acid, etc.; dithiobenzoic acid; dithioacetic acid; etc.

The accelerators of this invention may be produced from the methylol esters of the dithiocarboxylic acids which can be prepared as follows:

EXAMPLE A

Methylol dithiofuroate

| | |
|---|---|
| Ammonium dithiofuroate in 150 cc. water g__ | 16 |
| Concentrated HCl g__ | 11 |
| Formaldehyde (37%) g__ | 10 |
| Water and ice cc__ | 200 |

The aqueous ammonium dithiofuroate was slowly stirred into a mixture of the hydrochloric acid, formaldehyde, water, and ice. In a few minutes crystals separated. After standing one-half hour, the crystals were filtered off and washed with cold water. These crystals were methylol dithiofuroate. M. P. 40° C.

EXAMPLE B

| | |
|---|---|
| Crude disodium-2-hydroxy-1-dithionaphthoate in 200 cc. water g__ | 35 |
| Concentrated HCl cc__ | 20 |
| Formaldehyde (37%) g__ | 15 |
| Water cc__ | 400 |

The aqueous solution of the dithionaphthoate was stirred into a mixture of the hydrochloric acid, formaldehyde, and water. Orange-colored crystals separated at once. After standing for several hours, these were filtered off and, on washing with water, the methylol-2-hydroxy-1-dithionaphthoate was obtained. M. P. 152° C.

The reaction of the methylol esters with ammonia and amines is typified by the following equation:

$$R\text{---}C(S)\text{---}S\text{---}CH_2OH + HNR'R'' \rightarrow$$
$$R\text{---}C(S)\text{---}S\text{---}CH_2\text{---}NR'R'' + H_2O$$

If ammonia or a primary amine is used, two of the hydrogens may be replaced by two of the methylene radicals. In the case of ammonia, the three hydrogens may be replaced with the methylene radicals. The following examples are illustrative:

EXAMPLE 1

| | |
|---|---|
| Methylol - 2 - hydroxy - 1-dithionaphthoate g__ | 25 |
| Alcohol cc__ | 100 |
| Aniline g__ | 11 |

On adding the aniline, the solution became warm, and in a short time crystals separated. These melted at 116° C.

EXAMPLE 2

| | |
|---|---|
| Methylol-2-OH-1-dithionaphthoate g__ | 25 |
| Alcohol cc__ | 60 |
| Cyclohexyl amine g__ | 10 |

The mixture became warm and crystals separated almost immediately. The crystals melted with decomposition at 122–123° C.

EXAMPLE 3

| | |
|---|---|
| N,N'-diphenyl-p-phenylene-diamine g__ | 13 |
| Acetone cc__ | 75 |
| Methylol - 2 - hydroxy - 1 - dithionaphthoate g__ | 25 |

The solution was allowed to stand for 2 hours at room temperature, then stirred rapidly. Crystals began to separate. After 24 hours at room temperature, light orange-colored crystals were obtained, melting after recrystallization from acetone at 193° C.

Analysis: Sulfur found, 17.83 and 18.05 per cent; nitrogen found, 4.00 and 4.07 per cent.

Calculated to formula below: Sulfur, 17.70 per cent; nitrogen, 3.87 per cent.

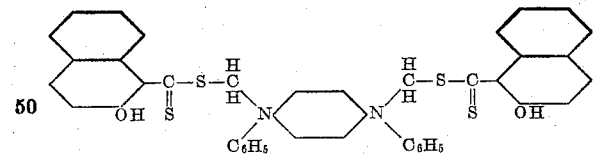

EXAMPLE 4

| | |
|---|---|
| Methylol dithiofuroate g__ | 17.5 |
| Alcohol cc__ | 100 |
| Aniline g__ | 10 |

Stirred aniline into solution of methylol dithiofuroate slowly, with cooling. A thick suspension of orange-colored crystals quickly formed. The melting point of the product was 97° C.

Analysis: Sulfur found, 26.45 and 26.53 per cent; nitrogen found, 5.46 and 5.54 per cent.

Caculated to anilinomethyl dithiofuroate: Sulfur, 25.70 per cent; nitrogen, 5.62 per cent.

EXAMPLE 5

| | | |
|---|---|---|
| N,N'-diphenyl-p-phenylene diamine | g | 13 |
| Acetone | cc | 100 |
| Methylol dithiofuroate | g | 19 |

Allowed solution to stand at room temperature, 3 hours, until crystals began to separate, then stirred rapidly. After 25 hours, a good yield of crystals was collected. After washing with hot acetone, these melted at 147° C.

Analysis: Sulfur found, 22.53 and 22.78 per cent; nitrogen found, 4.88 and 4.88 per cent.

Calculated to N,N'-diphenyl-p-phenylene-diamino-N,N'-bis-methylene dithiofuroate: Sulfur, 22.40 per cent; nitrogen, 4.88 per cent.

EXAMPLE 6

| | | |
|---|---|---|
| Methylol dithiofuroate | g | 20 |
| Benzene | cc | 100 |
| Concentrated NH4OH (28%) | g | 4 |

Stirred the mixture rapidly. Heat was evolved and red crystals soon began to separate. The reaction mixture was allowed to stand 3 days at room temperature, then filtered, and washed with benzene. M. P. 114° C.

Analysis: Sulfur found, 39.02 and 39.33 per cent; nitrogen found, 2.87 and 2.87 per cent.

Calculated to amino-trimethylene dithiofuroate: Sulfur, 39.60 per cent; nitrogen, 2.89 per cent.

The structural formula is:

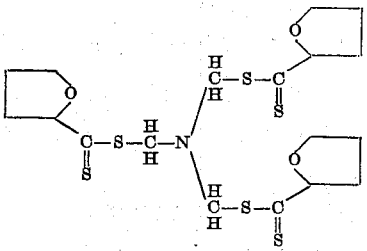

The efficacy of the compounds as accelerators of vulcanization is illustrated by the following examples. The accelerators of Examples 1 and 2 were compounded with natural rubber according to the following formula:

| | |
|---|---|
| Natural rubber | 100.0 |
| Sulfur | 3.0 |
| Zinc oxide | 5.0 |
| Accelerator | 0.5 |

After vulcanizing 20 minutes at 240° C., they gave the following test results:

| Example No. | Tensile Strength | Elongation | Modulus 300% |
|---|---|---|---|
| | Kg./sq. cm. | Per Cent | |
| 1 | 168 | 755 | 14 |
| 2 | 217 | 685 | 22 |

In addition to natural rubber, various synthetic rubber-like materials (such as rubber-like copolymers of butadiene-1,3 with other monomers, such as styrene, acrylonitrile, etc.) which are similarly vulcanizable, may also be used and, for the purposes of this invention, are to be considered to be equivalents of natural rubber. To illustrate this, other esters were compounded with GR–S according to the following formula:

| | |
|---|---|
| GR–S | 100.0 |
| Sulfur | 2.0 |
| Zinc oxide | 5.0 |
| Carbon black | 40.0 |
| Accelerator | 1.0 |

On curing as indicated, they gave the following test results:

| Example No. | Cure | Tensile Strength | Elongation | Modulus 300% |
|---|---|---|---|---|
| | Degrees | Kg./sq. cm. | Per Cent | |
| 3 | 50/300 | 75 | 600 | 25 |
| 4 | 50/240 | 113 | 515 | 80 |
| 5 | 50/300 | 108 | 500 | 53 |
| 6 | 50/260 | 104 | 555 | 43 |

The above examples are merely illustrative, and it is to be understood that the amount of accelerator and sulfur, etc., may be varied and that the composition of each mix may be otherwise varied. The time and temperature of the cures may also be varied.

This application is a continuation of my copending application Serial No. 508,405, filed October 30, 1943, now abandoned.

What I claim is:

1. The process of accelerating the vulcanization of natural rubber which comprises curing the same in the presence of sulfur and an aminomethyl ester of dithiofuroic acid.

2. Rubber vulcanized in the presence of sulfur and an aminomethyl ester of dithiofuroic acid.

ALBERT F. HARDMAN.

No references cited.